(12) United States Patent
Pang

(10) Patent No.: US 6,671,303 B1
(45) Date of Patent: Dec. 30, 2003

(54) CLOSED-LOOP PURGING SYSTEM FOR LASER

(75) Inventor: Yang Pang, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/166,591

(22) Filed: Jun. 10, 2002

(51) Int. Cl.[7] .............................. H01S 3/22; B01D 53/00
(52) U.S. Cl. ...................................... 372/59; 204/157.3
(58) Field of Search ........................ 372/55, 58, 59, 372/60

(56) References Cited

U.S. PATENT DOCUMENTS

| | | | | |
|---|---|---|---|---|
| 3,751,225 A | * | 8/1973 | Karlson | 422/116 |
| 4,229,709 A | * | 10/1980 | McMahan | 372/59 |
| 4,977,566 A | * | 12/1990 | Herbst et al. | 372/33 |
| 5,771,260 A | * | 6/1998 | Elliott et al. | 372/109 |
| 5,876,487 A | * | 3/1999 | Dahlgren et al. | 96/13 |
| 6,117,335 A | * | 9/2000 | Bender | 210/745 |
| 6,214,303 B1 | * | 4/2001 | Hoke et al. | 423/210 |
| 6,243,406 B1 | * | 6/2001 | Heist et al. | 372/59 |
| 6,419,487 B1 | * | 7/2002 | Tunnell et al. | 433/98 |
| 6,428,608 B1 | * | 8/2002 | Shah et al. | 95/123 |
| 6,504,860 B2 | * | 1/2003 | Newman et al. | 372/59 |
| 2002/0170815 A1 | * | 11/2002 | Fujii | 204/157.3 |
| 2003/0007537 A1 | * | 1/2003 | Pang et al. | 372/59 |

* cited by examiner

*Primary Examiner*—Paul Ip
*Assistant Examiner*—Phillip Nguyen
(74) *Attorney, Agent, or Firm*—Stallman & Pollock LLP

(57) ABSTRACT

A method of operating a laser is disclosed. Components of the laser are located in an enclosure, which may contain contaminants including water vapor and organic vapor released by the optical components, mounts of the optical components, or the enclosure itself. The enclosure may also contain suspended particulate matter and ozone. In order to reduce the level of these contaminants, a purging system extracts gas from the enclosure and passes the gas through a catalyst to decompose the ozone, a desiccant, an organic vapor trapping material, and a particulate matter filter, then returns the extracted gas to the enclosure. Decomposing ozone is particularly important if the laser generates radiation at a wavelength less than 250 nm.

8 Claims, 3 Drawing Sheets

CLOSED-LOOP PURGING SYSTEM FOR LASER

TECHNICAL FIELD OF THE INVENTION

The present invention relates generally hermetic sealing of lasers. The invention relates in particular to a closed-loop purging system for ozone, water vapor, organic vapor and particulate content in an enclosure surrounding an ultrafast laser resonator or an ultraviolet (UV) laser resonator.

DISCUSSION OF BACKGROUND ART

Ultrafast lasers are generally regarded as being lasers that deliver output radiation in pulses having a duration of a few hundred femtoseconds or less. One common ultrafast laser is a Ti:sapphire laser, which can be arranged to deliver output radiation at wavelengths between about 700 nanometers (nm) and about 1000 nm. The pulses delivered often have a relatively low energy, for example, tens of millijoules (mJ) to as little as tens of nanojoules (nJ). The short pulse-duration can cause the pulses to have a very high peak power, for example, on the order of gigawatts per square centimeter. ($GW/cm^2$) in certain locations in a resonator.

The very high peak powers delivered by such lasers can rapidly cause damage to optical components of the lasers, absent measures to inhibit such damage. Laser damage to optical components may be exacerbated by defects on or in optical surfaces of the components. Accordingly, it is not unusual that at least some portion of the optical components of an ultrafast laser are generated by so-called super-polishing techniques which yield surfaces having a surface smoothness of atomic dimensions, for example, about 4 Ångstrom Units (Å) root-mean-square (RMS) or less. Optical coatings for such super-polished components, reflective coatings in particular, are often deposited by ion-beam sputtering (IBS). IBS is a coating deposition method that can provide coatings having a high degree of chemical perfection and very low defect content. This minimizes absorption and scattering of radiation by the coatings. However, a super-polished, IBS-coated optical component can be as much as about five or more times more expensive than a similar component polished and coated by more conventional methods. Such additional expense can be wasted if the components are later contaminated by particulate matter, condensates, vapors, or the like.

It is not unusual in commercial laser manufacture to assemble lasers in clean-room conditions to minimize particulate deposition on optical components of the lasers. In such a case, it would be usual to place at least the optical resonator of the laser in an enclosure sufficiently sealed to minimize, at least, ingress of particulate contaminants, and preferably also, ingress of contaminants in gaseous or vapor form. Such an enclosure may be purged, before sealing, with filtered dry nitrogen, dry air or the like.

By implementing one or more above-discussed measures during manufacturing and assembly, an ultrafast laser may be operated for a total of as long as several thousand hours before the performance of the laser becomes significantly diminished by laser damage to one or more optical components thereof. It is believed, however, that even if an enclosure could be perfectly hermetically sealed, damage to optical components may result from contamination of optical components by outgassing products of the optical-components, adhesives and the enclosure itself. Outgassing products can be generated while the laser is operating and also while the laser is not operating.

It is believed that the most problematical of the outgassing products are organic vapors, which can be released from material such as adhesives, elastomer seals, and any plastic materials used in the construction of the enclosure. Water vapor may also be released from components of the enclosure or optics therein. The water vapor and the organic vapors can condense directly on surfaces of the optical components. The water vapor and organic vapors together or in combination can react with laser radiation while laser is operating. Products of the reactions can also condense or be deposited on the optical surfaces. These reaction products may include particulate matter such as carbon particles or soot. Most of these reaction products, if condensed or deposited on the optical surfaces can increase the vulnerability of the optical surfaces to damage by the laser radiation. Application Ser. No. 09/901,857, filed Jul. 9, 2001, assigned to the assignee of the present invention and incorporated herein by reference discloses one arrangement for minimizing contamination of optical components of a laser resonator. In this arrangement, a purging system extracts gas from the enclosure and passes the gas through a desiccant, an organic vapor trapping material, and a particulate matter filter, then returns the extracted gas to the enclosure. This arrangement has been found to be effective in removing most reaction products of the interaction of laser radiation with contaminants present in the enclosure as well as the contaminants themselves. In instances where the laser resonator generates ultraviolet laser radiation, however, it has been found that ozone can be generated as a reaction product of the laser radiation with oxygen or one or more contaminants. Ozone generation becomes problematical when the ultraviolet radiation has a wavelength less than 270 nm and becomes more problematical the shorter the wavelength. The level of generated ozone is not significantly reduced by the purging system and has been found to cause some deterioration of resonator components and absorption of ultraviolet radiation resulting in lowered power output.

SUMMARY OF THE INVENTION

The present invention is directed to a method of minimizing contamination of optical components of a laser, the components being located in a gaseous atmosphere within an enclosure. The gaseous atmosphere can contain contaminants including water vapor, organic vapor, and suspended particulate matter. These contaminants may be present at some low level, for example, hundreds of parts per billion or less, immediately after the components are placed in the enclosure. The contaminant level can increase with both operational and non-operational time of the laser. In a laser system providing ultraviolet radiation the atmosphere in the enclosure may include ozone generated as a result of interaction between one or more of the contaminants and the ultraviolet radiation.

In one aspect of the present invention, the method comprises extracting gas from the atmosphere within the enclosure. The extracted gas is passed through a catalyst to convert ozone into oxygen, through a first medium selected to reduce the water vapor content of the extracted gas; through a second medium selected to reduce the organic vapor content of the extracted gas; and through a filter selected to reduce the particulate matter content of the extracted gas. After the extracted gas is passed through the catalyst, the first and second media and the filter, it is returned to the enclosure.

The extraction and replacement cycle preferably takes place continuously during operation of the laser such that the water vapor, organic vapor, and particulate matter content of the atmosphere in the enclosure is maintained at a minimum consistent with the selection of the media and the filter.

In another aspect of the invention, in an enclosure for a laser generating radiation at a wavelength of less than 270 nm, ozone generation can cause significant power loss, a problem that cannot be adequately mitigated by filtering and vapor trapping alone, or by pre-purging the enclosure with an inert gas. Accordingly, in such an enclosure, the ozone removal of the present invention is important as much for efficient operation of the laser as for preventing progressive deterioration of laser components.

In yet another aspect of the invention, apparatus for carrying out the method includes a gas conditioning arrangement including the catalyst, the first (a desiccant) medium, the second (a medium for trapping organic vapors) medium, and the filter for trapping particulate matter. The apparatus includes a pump, which is arranged to extract gas from the enclosure and deliver the extracted gas to the gas-conditioning arrangement. The gas conditioning arrangement is configured such that the extracted air is drawn by the pump over the catalyst, then urged by the pump through the desiccant medium, the organic vapor trapping medium, and the filter, and is subsequently returned to the enclosure.

In one preferred embodiment, the apparatus further includes first and second valves. The first and second valves are arranged such that a drying gas may be circulated through the desiccant medium for regenerating the desiccant medium while preventing the drying gas from reaching the enclosure.

Maintaining a low organic vapor content in a laser resonator is particularly important if the laser resonator is an ultrafast laser resonator or a laser resonator arranged to generate ultraviolet laser radiation. The relatively high-energy of ultraviolet laser radiation, multiphoton processes in the case of ultrafast lasers, generating longer wavelength radiation can increase the probability of reactions between the laser radiation and the organic vapors or their condensates. As noted above, products of these reactions, including particulate matter, can lead to unstable operation of the laser, or accelerated damage to optical components of the laser resonator.

DETAILED DESCRIPTION OF THE INVENTION

Figure 1:
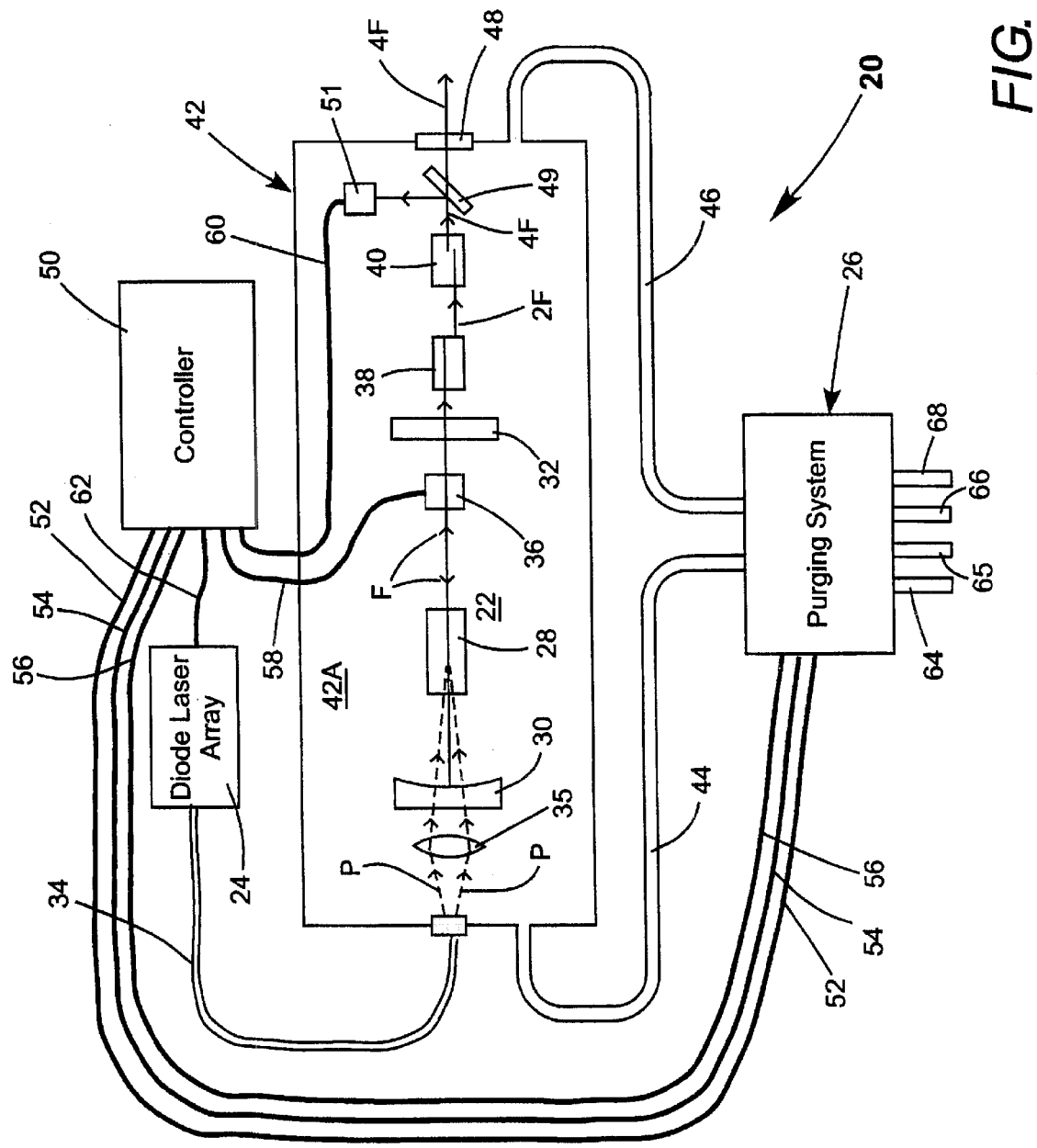
FIG. 1 schematically illustrates an ultrafast laser including an enclosure housing a laser resonator including a solid state gain medium and two optically nonlinear crystals, a source of optical pump light for optically pumping the solid-state gain- medium, a controller, and a purging system in accordance with the present invention for minimizing contaminants in the enclosure.

Referring now to FIG. 1, laser 20 includes a laser resonator 22, a source 24 of optical pump light, and a purging system 26 in accordance with the present invention. In this example, laser resonator 22 is a solid-state laser resonator including a solid-state gain-medium radiation 28 for generating fundamental radiation at a wavelength of about 1064 nanometers (nm). Resonator 22 is formed between mirrors 30 and 32. Preferred gain-media for generating radiation at this wavelength are neodymium-doped YAG (Nd:YAG) and neodymium-doped yttrium orthovanadate (Nd:YVO$_4$). Light source 24, in this example, is a diode-laser array providing optical pump radiation at a wavelength of about 808 nm. The pump light is transmitted via an optical fiber bundle 34, then focused by a lens 35 through mirror 30 into gain medium 28 as indicated by broken lines P.

Fundamental radiation circulates in resonator 22 as indicated by arrows F. Fundamental radiation is delivered from the resonator in the form of pulses the delivery of which is controlled by a Q-switch 36. Pulses delivered by the resonator are first doubled in frequency by an optically nonlinear crystal 38. The frequency-doubled radiation is designated by arrow 2F. Frequency-doubled radiation 2F is directed into another opticallynonlinear crystal 40 to provide frequency quadrupled radiation 4F having a wavelength of about 266 nm, a wavelength in the ultraviolet region of the electromagnetic spectrum. It is believed that the actual threshold (longest) wavelength for ozone generation is dependent on the actual pulse power with higher pulse powers having a longer threshold wavelength.

Laser resonator 22 and components thereof are located, together with optically nonlinear crystals 38 and 40, in an enclosure 42. The purging system 26 extracts the atmosphere (including contaminant gases vapors and particulates suspended therein) from enclosure 42 via a conduit 44, treats the extracted atmosphere to remove the contaminants, and returns the treated atmosphere to enclosure 42 via a conduit 46. The manner of treating the contaminated atmosphere is described in detail further hereinbelow. Frequency quadrupled radiation 4F is delivered from the enclosure via a window 48 therein. A portion of the radiation is sampled by a beamsplitter 49 and directed to a detector 51 for measuring laser output power.

Laser 20 includes a controller 50 arranged to control operations and parameters the laser resonator, the pump light source, and the purging system. Controller 50 controls operations of purging system 26 via electrical connections 52, 54, and 56. The controller controls operations and parameters of laser resonator 22 via electrical connections 58 and 60. Connection 58 connects Q-switch 36 to the controller for controlling pulse repetition rate. Connection 60 connects detector 51 to the controller for monitoring power output. Connection 62 connects the controller to diode-laser array 24 for controlling pump power delivered to gain medium 28 and ultimately, cooperative with signals from detector 21, controlling power output of laser 20. Purging system 26 also includes conduits 64, 65, 66, and 68. Conduits 66 and 68 connect with a desiccant module (not shown in FIG. 1) in the purging system.

The interior (atmosphere) 42A of enclosure 42 is maintained at about ambient atmospheric pressure. The atmosphere of enclosure 42 will usually be an air atmosphere. Before connecting and operating purging system 26, enclosure 42 may be flushed with an inert gas such as nitrogen to remove the bulk of contaminants resulting from manufacture, mounting and assembly of components, and to reduce the oxygen content of the atmosphere. Conduits 64 and 65 provide access for purging enclosure 42 with an inert gas or the like.

Whatever the gaseous atmosphere of enclosure 42, after this initial flushing, it can be expected to include some finite level of contaminants, however small that level. As noted above, particulate matter may include particulate matter that was present at the time that the enclosure was closed, and particulate matter generated as a result of interaction between laser radiation circulating in resonant cavity 52 and the organic vapors. In a laser generating ultraviolet radiation, ozone may be generated by interaction of the ultraviolet radiation with oxygen or hydrocarbon vapors in the atmosphere.

Figure 2:
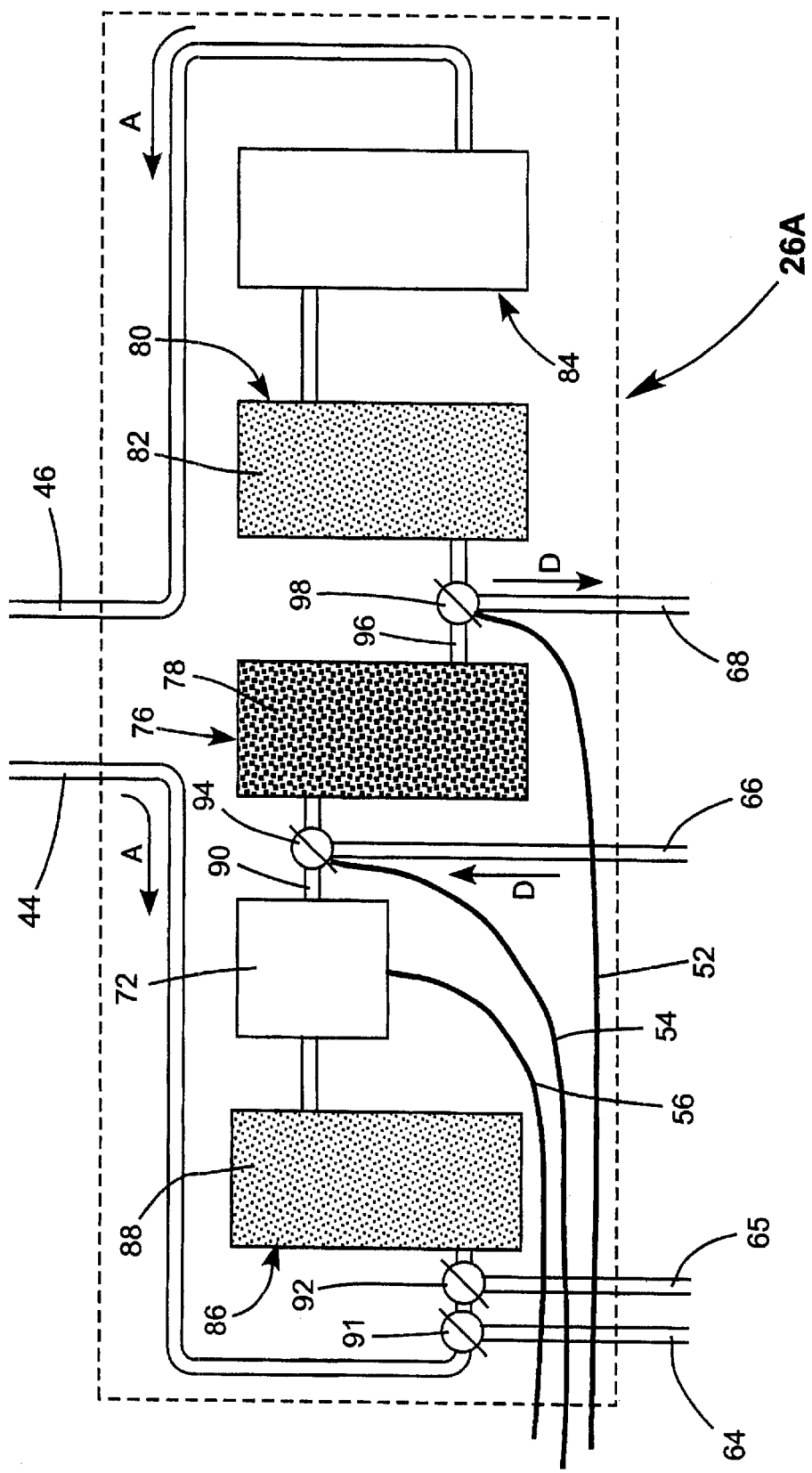
FIG. 2 schematically illustrates one preferred embodiment of the purging system of FIG. 1.

Referring now to FIG. 2, one preferred embodiment 26A of a purging system 26 in accordance with the present invention includes a pump 72 and a gas conditioning arrangement. The gas conditioning arrangement includes a container 76 containing a desiccant material 78, a container 80 including an organic vapor trapping material 82, a filter unit 84 for filtering particulate matter, and a container 86 containing a catalyst 88 for converting ozone into oxygen.

Desiccant material 78 is preferably silica gel, but may be any desiccant material. A preferred organic vapor trapping material 82 is a high surface-area, coconut-shell based, activated carbon. Organic vapor traps including this material are available in various sizes from Agilent Technologies, Inc. of Palo Alto, Calif. Other suitable organic vapor trapping materials include a 5 Å molecular sieve. Filter unit 84 is preferably capable of trapping particles having a size of about 0.5 micrometers ($\mu$m) and greater, for example, a HEPA filter. One suitable HEPA filter is available from the Pall Gellman Sciences Inc. of Ann Arbor, Mich. as HEPA Capsule Part No. 12144. This filter has a pore size of 0.3 $\mu$m and has a filtering efficiency of 99.97% for 0.3 $\mu$m DOP aerosol. Catalyst 88 is preferably silver oxide. The catalyst catalyzes a reaction that converts two molecules of ozone into three molecules of oxygen. Manganese oxide is another suitable catalyst for catalyzing this reaction. The catalyst is not consumed in the reaction.

Pump 72 extracts gas from the atmosphere of enclosure 42 via conduit 44. The pump draws the extracted gas via two-way valves 91 and 92 through catalyst 88 in container 86 to convert any ozone therein into oxygen. The circulation direction of gas through the purging system is indicated in FIG. 2 by arrows A. The gas is urged by pump 72 via a conduit 90 and a two-way valve 94 through desiccant material (medium) 78 in container 76; through a conduit 96; through another two-way valve 98; and then through organic vapor trapping material 82. After passing through the organic vapor trapping material, the gas passes through HEPA filter 84 into conduit 46, which returns the gas to enclosure 42. As noted above, desiccant material 78 reduces the water vapor content of the gas, and organic vapor trapping material 82 reduces the organic vapor content of the gas. HEPA filter 114 reduces the particulate matter content of the gas. Valves 91, 92, 94, and 98 in this mode of operation prevent any of the extracted gas from escaping the purging system via conduits 64, 66, and 68.

In one preferred cycle of operation of purging system 26A, the extraction and return of gas from and to the enclosure takes place continually during any period in which laser 20 is operating. Operation of the purging system is started and stopped by correspondingly starting or stopping pump 72 by commands delivered thereto from controller 50 via electrical connection 56. Continuous operation of purging system 26A can provide that in the atmosphere of enclosure 42, the ozone, water vapor, organic vapor, and particulate matter content of the atmosphere are maintained at a minimum consistent with the materials and configuration of the gas conditioning arrangement. It is possible, of course, that the inventive purging system could be activated and deactivated by controller 50 based on measurements of particle count or concentrations of particular vapor species. This, however, would require providing corresponding sensors, which could increase the cost of a laser or the purging system.

After a period of operation, depending on the ambient atmosphere in which laser 20 is located, or the conditions of operation of the laser, desiccant material 78 may become saturated with water vapor. Should this occur, desiccant material 78 may be revived or regenerated by passing a drying gas, such as dry air or dry nitrogen, through the material, as follows.

Figure 3:
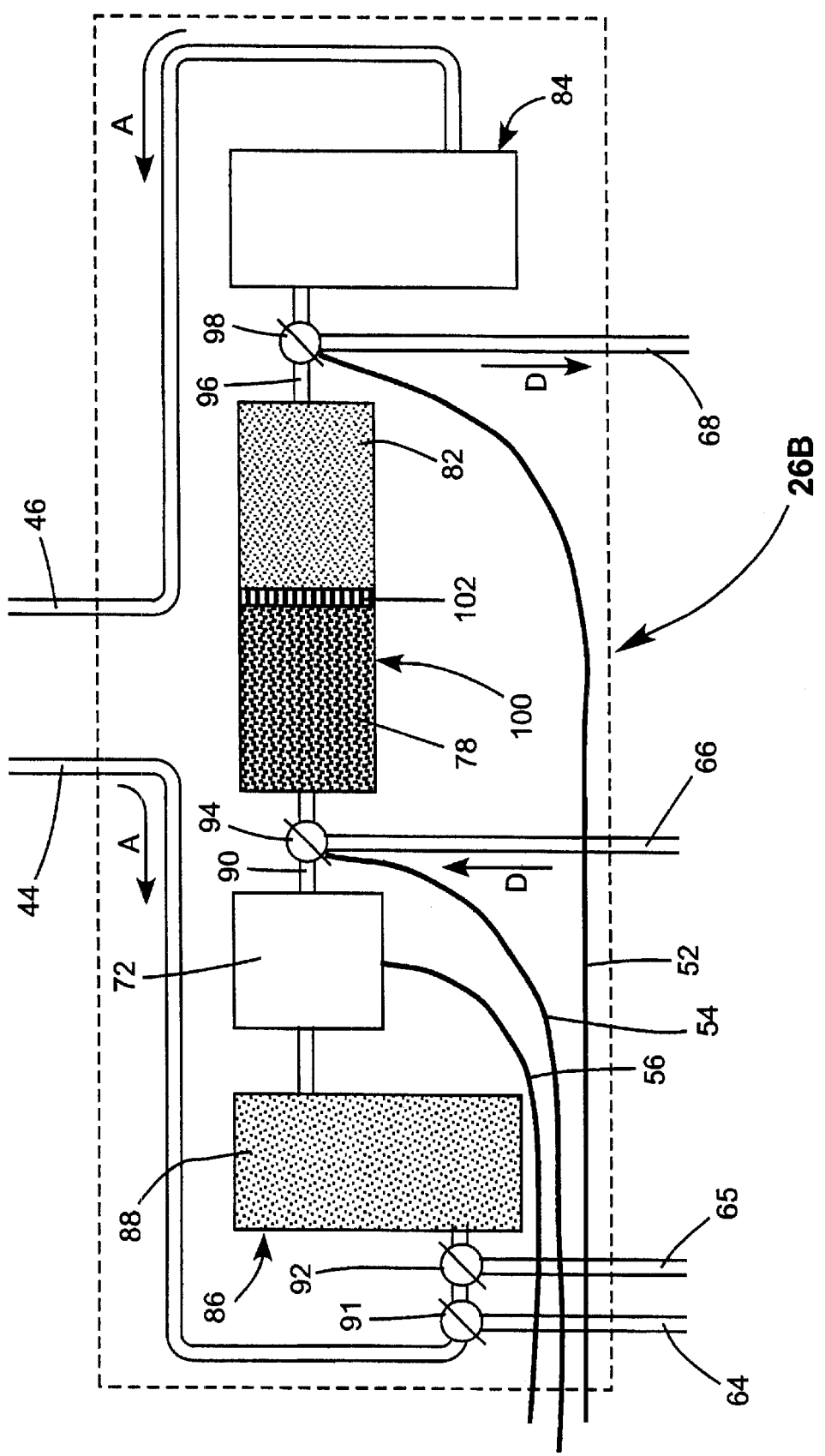
FIG. 3 schematically illustrates another preferred embodiment of the purging system of FIG. 1.

Operation of pump 72 is stopped. Valve 94 is switched to prevent air from being delivered from pump 72 to the desiccant material, and to allow the drying gas to be delivered to the desiccant material via conduit 66. Valve 98 is switched to prevent any drying gas from reaching enclosure 42 via the organic vapor trapping material, the HEPA filter, and conduit 46. This switching allows drying gas delivered to the desiccant material via conduit 66 to pass through the desiccant material and exit the purging system via conduit 68 as indicated in FIG. 3 by arrows D. After the desiccant material has been regenerated, valves 94 and 98 are switched back to a position that allows gas extracted from enclosure 42 to pass to the gas conditioning system and return to the enclosure via conduit 46. Valves 94 and 98 may be operated by commands delivered thereto along connections 52 and 54 from controller 50.

In order to further minimize ozone content of enclosure 42 during operation it can be advantageous to initially purge enclosure 42 with an inert gas such as nitrogen. This can be accomplished in purging system 26A by connecting a nitrogen source to conduit 65 and operating pump 72 and valves 91, 92, 94 and 96 such that the nitrogen is urged through the gas conditioning system and enclosure 42 to expel the original atmosphere of the enclosure via conduit 64. Valves 91 and 92 are operated manually for this procedure in purging system 26A. Provision can be made, however, for operation of the valves by controller 50.

Another preferred embodiment 26B of a purging system in accordance with the present invention is depicted in FIG. 3. Purging system 26B is similar to purging system 26A of FIG. 3 with an exception that desiccant material 78 and organic vapor trapping material 82 are contained in a single container 100. A permeable diaphragm or separator 102 separates the desiccant material from the organic vapor trapping material. One such combined desiccant and organic vapor trapping unit is available from the W. A. Hammond Drierite Company Ltd of Xenia, Ohio as Part No. 27068.

It is emphasized here that the sequence of vapor reduction and filtering is particularly important in the method and apparatus of the present invention. If water vapor reduction does not precede organic vapor reduction there could be a significant degradation in the efficiency of organic vapor reduction. As there is a possibility that water vapor removal materials and organic vapor trapping materials can generate particulate matter, it is important that particulate matter filtering takes place following water vapor reduction and organic vapor reduction. It is also important that conversion of ozone in extracted gas into oxygen takes place before the extracted gas passes through pump 72. This minimizes to possibility of corrosion of the pump by the ozone.

In the description of laser 20 given above, laser resonator 22, controller 50, and purging system 26 are described as separate units. This arrangement should not be construed as limiting the present invention. By way of example, as the size of the purging system can be relatively small compared with the laser resonator, the purging system and the laser resonator may be combined in a single unit or housing. Alternatively, the purging system may be combined in a single housing with the controller. In another arrangement, purging system 26 may be configured as a stand-alone module including a dedicated controller separate from controller 50. One skilled in the art to which the present invention pertains may devise other configurations of the purging system, the laser resonator and one or more controllers without departing from the spirit and scope of the present invention.

The purging system of present invention is described above with reference to its use with a pulsed, frequency-tripled, solid-state laser. This should not be construed as limiting the present invention. The inventive purging system is applicable to other lasers such as solid-state ultrafast lasers and ultrafast lasers including dyes or semiconductor materials as gain media. As noted above, the very high-power and short duration of ultrafast laser pulses can increase the possibility of the ultrafast laser radiation reacting with any organic contaminants that may be found in the atmosphere in the resonant cavity of the laser. Also as noted above, the inventive purging system is particularly useful in ultraviolet lasers where the high-energy of the ultraviolet radiation also increases the possibility of reactions with any organic contaminants in the laser resonator. Costs permitting, however, it may be found useful to use the inventive purging system with any other laser with the goal of extending the operating lifetime of optical components or reliability of operation of the laser.

The present invention is described above in terms of a preferred and other embodiments. The invention is not limited, however, to the embodiments described and depicted herein. Rather, the invention is limited only by the claims appended hereto.

What is claimed is:

1. Apparatus, comprising:

an enclosure;

a laser located in a gaseous atmosphere within said enclosure;

a gas conditioning arrangement located outside of said enclosure, said gas conditioning arrangement including a pump, a catalyst for converting ozone into oxygen, a desiccant medium for minimizing water vapor content of the gaseous atmosphere, a medium for trapping organic vapors, and a filter for trapping particulate matter, said gas conditioning arrangement being in fluid communication with the enclosure; and wherein said pump is arranged to extract gas from said enclosure and deliver said extracted gas to said gas-conditioning arrangement with said gas conditioning arrangement being configured such that said extracted air delivered thereto passes through said catalyst, said desiccant medium, said organic vapor trapping medium, and said filter in the sequence listed and is then returned to said enclosure.

2. The laser of claim 1, wherein said catalyst is silver oxide.

3. The method of claim 1, wherein said catalyst is manganese oxide.

4. The laser of claim 1, wherein said desiccant medium is silica gel.

5. The laser of claim 1, wherein said organic vapor trapping medium is activated carbon.

6. The laser of claim 1, wherein said organic vapor trapping medium is a molecular sieve.

7. The laser of claim 1, wherein said filter is a HEPA filter.

8. The laser of claim 1, further including a pair of conduits and a pair of valves, said conduits and said valves arranged such that a drying gas can be passed through said desiccant medium for regenerating the desiccant medium while preventing said drying gas from entering said enclosure.

* * * * *